US012404683B2

(12) United States Patent
Gomo et al.

(10) Patent No.: US 12,404,683 B2
(45) **Date of Patent: *Sep. 2, 2025**

(54) ELEVATOR TRENCH DRAIN

(71) Applicant: ZURN WATER, LLC, Milwaukee, WI (US)

(72) Inventors: David M. Gomo, Lake City, PA (US); Robert A. DiPlacido, Erie, PA (US); Jaroslaw J. Plachotnik, Jamestown, NY (US); Jason E. Morris, Erie, PA (US)

(73) Assignee: ZURN WATER, LLC, Milwaukee, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/309,656

(22) Filed: Apr. 28, 2023

(65) Prior Publication Data

US 2023/0265664 A1 Aug. 24, 2023

Related U.S. Application Data

(63) Continuation of application No. 17/228,448, filed on Apr. 12, 2021, now Pat. No. 11,674,320, which is a (Continued)

(51) Int. Cl.
*E04F 17/00* (2006.01)
*B66B 13/30* (2006.01)
(Continued)

(52) U.S. Cl.
CPC ............ *E04F 17/00* (2013.01); *B66B 13/301* (2013.01); *E03F 5/0407* (2013.01); *E03F 5/06* (2013.01);
(Continued)

(58) Field of Classification Search
CPC ....... E04C 3/02; E04C 2003/026; E04H 9/02; F16B 2/065; F16B 7/0413; E04B 2001/5868
See application file for complete search history.

(56) References Cited

U.S. PATENT DOCUMENTS 2,182,795 A 12/1939 Day
2,363,567 A 11/1944 Blakeman
(Continued)

FOREIGN PATENT DOCUMENTS

DE 19622021 A1 12/1997
EP 1630309 A1 3/2006
(Continued)

OTHER PUBLICATIONS

Exam report issued from the Canadian Patent Office for related Application No. 2925260 dated Apr. 27, 2022 (5 Pages).

*Primary Examiner* — Brent W Herring
(74) *Attorney, Agent, or Firm* — Husch Blackwell LLP

(57) ABSTRACT

A trench drain includes a trench, a grating seat and a grating hingedly connected to the trench. The trench has a base wall with peripheral side walls extending upwardly therefrom and an outwardly-extending peripheral flange. The grating seat is configured to receive the grating. The peripheral side walls of the trench have a pair of opposing elongated slots formed therein and the grating has a pair of posts on opposing ends thereof. Each of the pair of posts on the grating are received in a respective one of the pair of opposing elongated slots of the trench to establish an axis of rotation.

20 Claims, 3 Drawing Sheets

Related U.S. Application Data continuation of application No. 16/780,623, filed on Feb. 3, 2020, now Pat. No. 10,975,583, which is a continuation of application No. 16/271,324, filed on Feb. 8, 2019, now Pat. No. 10,570,628, which is a continuation of application No. 15/689,896, filed on Aug. 29, 2017, now Pat. No. 10,240,351, which is a continuation of application No. 15/262,179, filed on Sep. 12, 2016, now Pat. No. 9,777,489.

(60) Provisional application No. 62/298,159, filed on Feb. 22, 2016.

(51) Int. Cl.
*E03F 5/04* (2006.01)
*E03F 5/06* (2006.01)

(52) U.S. Cl.
CPC ....... *E03F 2005/061* (2013.01); *E04F 17/005* (2013.01)

(56) References Cited

U.S. PATENT DOCUMENTS

| | | | | |
|---|---|---|---|---|
| 2,779,430 | A | 1/1957 | Sisk | |
| 2,889,928 | A | 6/1959 | Sisk | |
| 3,040,895 | A | 6/1962 | Sisk | |
| 3,246,582 | A | 4/1966 | Clare et al. | |
| 3,455,059 | A | 7/1969 | Evans, III | |
| 3,990,469 | A | 11/1976 | Ralston | |
| 4,067,072 | A | 1/1978 | Izzi | |
| D259,950 | S | 7/1981 | Henry | |
| 4,321,713 | A | 3/1982 | Thompson | |
| RE31,561 | E | 4/1984 | Thompson | |
| 4,541,132 | A | 9/1985 | Long | |
| 4,912,349 | A | 3/1990 | Chang | |
| 4,964,180 | A | 10/1990 | Harbeke | |
| 5,017,039 | A | 5/1991 | Spiess et al. | |
| 5,032,264 | A * | 7/1991 | Geiger | E03F 5/041 210/163 |
| 5,213,438 | A | 5/1993 | Barenwald | |
| 5,230,188 | A * | 7/1993 | Nurse | E03F 5/0407 52/177 |
| 5,319,812 | A | 6/1994 | Harrahan et al. | |
| 5,324,135 | A | 6/1994 | Smith | |
| D355,707 | S | 2/1995 | Emanuele et al. | |
| 5,466,091 | A | 11/1995 | Sauerwin et al. | |
| 5,864,990 | A | 2/1999 | Tu | |
| 5,954,952 | A | 9/1999 | Strawse, Sr. | |
| 5,979,607 | A | 11/1999 | Allen | |
| 6,003,169 | A | 12/1999 | Davis, Jr. | |
| 6,272,804 | B1 | 8/2001 | Leis | |
| 6,290,143 | B1 | 9/2001 | Vincent et al. | |
| 6,558,769 | B1 | 5/2003 | Chwala | |
| 6,810,537 | B1 | 11/2004 | Barnes et al. | |
| 6,941,703 | B2 | 9/2005 | MacLean et al. | |
| 7,033,489 | B2 | 4/2006 | Thompson et al. | |
| D523,537 | S | 6/2006 | Howard | |
| 7,114,872 | B2 | 10/2006 | Alba | |
| 7,293,937 | B2 | 11/2007 | Fuchs | |
| 7,303,669 | B2 | 12/2007 | Monneret | |
| 7,316,834 | B2 | 1/2008 | Hernandez | |
| D582,527 | S | 12/2008 | Wang | |
| 7,588,392 | B2 | 9/2009 | Wroblewski et al. | |
| 7,631,471 | B2 | 12/2009 | Grunewald et al. | |
| 7,744,304 | B2 | 6/2010 | Akkala et al. | |
| 8,181,288 | B1 | 5/2012 | Davis, Jr. | |
| 8,226,824 | B2 | 7/2012 | Mondschein et al. | |
| D672,015 | S | 12/2012 | Luke | |
| 8,474,068 | B2 | 7/2013 | Kik, Sr. et al. | |
| 8,505,125 | B1 | 8/2013 | Chia et al. | |
| 8,549,678 | B2 | 10/2013 | Neidich et al. | |
| 8,658,033 | B2 | 2/2014 | Farkas | |
| 8,677,521 | B2 | 3/2014 | Stimpson | |
| 8,800,226 | B2 | 8/2014 | Bloch | |
| 9,010,363 | B2 | 4/2015 | Huber | |
| 9,027,715 | B2 | 5/2015 | Bloch et al. | |
| 9,206,593 | B2 | 12/2015 | Tripodi et al. | |
| 9,382,701 | B2 | 7/2016 | Meyers | |
| 9,617,723 | B2 | 4/2017 | Stonecipher et al. | |
| 9,777,489 | B2 | 10/2017 | Gomo et al. | |
| 9,822,539 | B1 | 11/2017 | Krombein | |
| 10,047,512 | B2 | 8/2018 | Chromey | |
| 10,167,621 | B2 * | 1/2019 | Priester | E06B 1/70 |
| 10,240,351 | B2 | 3/2019 | Gomo et al. | |
| 10,501,926 | B2 | 12/2019 | Priester | |
| 10,570,628 | B2 | 2/2020 | Gomo et al. | |
| 10,975,583 | B2 | 4/2021 | Gomo et al. | |
| 2002/0078498 | A1 | 6/2002 | Cheng | |
| 2004/0238424 | A1 | 12/2004 | Thompson et al. | |
| 2004/0256298 | A1 | 12/2004 | Curlol | |
| 2005/0230295 | A1 | 10/2005 | Monneret | |
| 2005/0284704 | A1 | 12/2005 | Hernandez, Jr. | |
| 2006/0048469 | A1 * | 3/2006 | MacLean | E03F 5/0402 52/220.3 |
| 2006/0171778 | A1 | 8/2006 | Fuchs | |
| 2007/0034577 | A1 | 2/2007 | Bayard et al. | |
| 2007/0177942 | A1 * | 8/2007 | Meyers | E03F 3/046 405/40 |
| 2007/0204399 | A1 * | 9/2007 | DeGooyer | E03F 5/0408 4/679 |
| 2008/0014022 | A1 | 1/2008 | Wroblewski et al. | |
| 2008/0019776 | A1 * | 1/2008 | Fithian | E03F 3/046 405/118 |
| 2008/0276368 | A1 | 11/2008 | Neidich et al. | |
| 2009/0097921 | A1 | 4/2009 | Hetzler et al. | |
| 2009/0113621 | A1 | 5/2009 | DeGooyer et al. | |
| 2009/0236293 | A1 | 9/2009 | Alvarado | |
| 2009/0241442 | A1 * | 10/2009 | MacLean | A01K 1/0151 52/302.1 |
| 2010/0162481 | A1 | 7/2010 | Erlebach | |
| 2011/0023978 | A1 | 2/2011 | Keizers | |
| 2011/0061161 | A1 * | 3/2011 | Erlebach | E03F 5/0408 4/679 |
| 2011/0067175 | A1 | 3/2011 | Sleylaerts et al. | |
| 2011/0088161 | A1 | 4/2011 | Stimpson | |
| 2011/0139694 | A1 | 6/2011 | Mondschein et al. | |
| 2011/0162137 | A1 | 7/2011 | Kik, Sr. et al. | |
| 2011/0185657 | A1 | 8/2011 | Delaquis | |
| 2012/0031712 | A1 | 2/2012 | Bloch et al. | |
| 2012/0110827 | A1 | 5/2012 | Doolittle et al. | |
| 2012/0266968 | A1 | 10/2012 | Bloch et al. | |
| 2012/0273050 | A1 | 11/2012 | Metzger et al. | |
| 2012/0324644 | A2 | 12/2012 | Neidich et al. | |
| 2013/0098472 | A1 | 4/2013 | Farkas | |
| 2013/0276226 | A1 | 10/2013 | Cook et al. | |
| 2013/0326806 | A1 | 12/2013 | Stonecipher et al. | |
| 2014/0230140 | A1 | 8/2014 | Davis, Jr. | |
| 2014/0262996 | A1 | 9/2014 | Alvarado | |
| 2014/0352815 | A1 | 12/2014 | Brodey et al. | |
| 2014/0373943 | A1 | 12/2014 | Huber | |
| 2015/0240464 | A1 | 8/2015 | Meyers | |
| 2015/0275498 | A1 | 10/2015 | Belanger | |
| 2015/0306092 | A1 | 10/2015 | Chromey et al. | |
| 2015/0308092 | A1 * | 10/2015 | Chromey | E03F 3/046 137/363 |
| 2016/0194861 | A1 | 7/2016 | Nivelles | |
| 2016/0305109 | A1 | 10/2016 | Meyers | |
| 2016/0309965 | A1 | 10/2016 | Berkey | |
| 2017/0089331 | A1 | 3/2017 | Bialick et al. | |
| 2017/0211267 | A1 | 7/2017 | Stonecipher et al. | |
| 2018/0030713 | A1 | 2/2018 | Howson | |
| 2018/0087260 | A1 | 3/2018 | Priester | |
| 2018/0320357 | A1 | 11/2018 | Chromey et al. | |
| 2018/0320358 | A1 | 11/2018 | Chromey et al. | |
| 2019/0032323 | A1 | 1/2019 | Priester | |
| 2021/0102348 | A1 | 4/2021 | Priester | |

FOREIGN PATENT DOCUMENTS

| | | | |
|---|---|---|---|
| EP | 2902556 | A1 | 8/2015 |
| GB | 2468838 | A | 9/2010 |
| JP | S52115038 | A | 9/1977 |

(56) References Cited

FOREIGN PATENT DOCUMENTS

| | | | |
|---|---|---|---|
| JP | H05105350 | A | 4/1993 |
| JP | H06227773 | A | 8/1994 |
| JP | H0761743 | A | 3/1995 |
| JP | H1059661 | A | 3/1998 |
| JP | H10324485 | A | 12/1998 |
| JP | 2000219453 | A | 8/2000 |
| JP | 2005082363 | A | 3/2005 |
| JP | 2009196729 | A | 9/2009 |
| JP | 2011195249 | A | 10/2011 |
| JP | 2016156245 | A | 9/2016 |
| WO | 9822381 | A1 | 5/1998 |
| WO | 2014012526 | A1 | 1/2014 |

* cited by examiner

ELEVATOR TRENCH DRAIN

CROSS-REFERENCE TO RELATED APPLICATION

This application is a continuation patent application of U.S. patent application Ser. No. 17/228,448, filed on Apr. 12, 2021, which is a continuation of U.S. patent application Ser. No. 16/780,623, filed on Feb. 3, 2020, which is a continuation of U.S. patent application Ser. No. 16/271,324, filed on Feb. 8, 2019, which is a continuation of U.S. patent application Ser. No. 15/689,896 filed on Aug. 29, 2017, which is a continuation of U.S. Ser. No. 15/262,179 filed on Sep. 12, 2016 and which claims the benefit of U.S. Provisional Patent Application No. 62/298,159 filed Feb. 22, 2016, which are hereby incorporated by reference for all purposes as if set forth in their entirety herein.

STATEMENT OF FEDERALLY SPONSORED RESEARCH OR DEVELOPMENT

Not applicable.

TECHNICAL FIELD

This disclosure relates to drains and, in particular, trench drains for use proximate the threshold of an elevator door to prevent water from flowing down an elevator shaft.

BACKGROUND

Nearly all multi-story buildings are required to have fire prevention systems installed. Such fire prevention systems include water lines and sprinklers which, in the event of the detection of a fire, can distribute large volumes of water in the vicinity of a fire. Such fire prevention systems are particularly of importance in multi-story buildings because, in the event of a fire, there may not be an easy way for firefighters at ground level to get several stories up before the fire has had a chance to spread.

However, it is also often the case that multi-story buildings are not well-equipped to accommodate the drainage of such large volumes of water, especially above ground level. In many instances, if the building includes one or more elevators, then the water provided by the fire prevention system collects on the floors above ground level and may have a tendency to flow down the elevator shaft. Because there is the possibility that both the elevator car and other equipment may exist between the floor and the elevator pit, water drainage into the elevator shaft is to be avoided.

Some drainage systems have been developed to address this problem. See e.g., PCT International Publication No. WO 98/22381 and U.S. Pat. No. 8,800,226. Such systems generally route water laterally into vertical pipes to limit the amount of water entering the open elevator shaft.

SUMMARY

However, the current state of the art drains either need to have great depth to account for the volumes of water that flow therethrough or run the risk of having water overflow from the drain into the elevator shaft.

To prevent draining of water into an elevator and to avoid needing have a deep drain, an improved elevator trench drain is disclosed herein with a low profile that still accommodates high flows of water therethrough. This elevator trench drain may be located at a lower threshold of an elevator door between the floor of the building and the elevator shaft. In this position, any water that collects on the floor (due to, for example, a sprinkler system operating) may be collected in the elevator trench drain and controllably routed to a drainage pipe, rather than simply flowing down into the open elevator shaft. Among other things, this drain can have a low profile, can have a multi-diameter drain opening that builds a head pressure to increase flow out of the drain, and can have a hinged grating for easy installation and access to the trench.

According to one aspect, an elevator trench drain includes a trench and a drain passageway. The trench includes a base wall with peripheral side walls that extend upwardly from the base wall to a trench volume therein. The drain passageway extends downwardly from the base wall of the trench and places the trench volume in fluid communication with a lower opening of the drain passageway (which may be in connection with further drain pipes for routing of the collected water). The drain passageway has a first section proximate the base wall defining a first cross-sectional area and a second section distal the base wall defining a second cross-sectional area. The second cross-sectional area is less than the first cross-sectional area and this reduction from the first cross-sectional area to the second cross-sectional area creates a head pressure that increases the flow out of the lower drain passageway opening during use.

An elevator trench drain of this type may be disposed proximate a lower edge of an elevator door to assist in drainage in the event that water collects on the floor of a multi-story building and to prevent water from draining into the elevator pit in an uncontrolled fashion.

In many forms, the elevator trench drain will have a grating. In some forms, this grating may be hingedly connected to the trench. To provide this hinged connection, the peripheral side walls of the trench may have a pair of opposing elongated slots formed in them and the grating may have a pair of posts on opposing ends thereof. Each of the pair of posts on the grating can be received in a respective one of the pair of opposing elongated slots of the trench to establish an axis of rotation and to permit the assembly/disassembly of the grating to the drain by temporarily axially misaligning the posts relative to the slots. In some forms, the pair of opposing elongated slots may be integrally formed in the peripheral sidewalls of the trench (by welding or casting, for example). It is contemplated that in some forms, each of the slots may positively extend inwardly into the trench from the sidewall. For example, the pair of opposing elongated slots may each be a wall that extends generally perpendicularly from the peripheral side wall of the trench volume and this wall may form a closed loop forming one of the slots into which one of the posts of the grating is received.

With respect to the drain passageway, the first section may have a first distance of downward extension having the first cross-sectional area which is constant along the first distance of downward extension and the second section may have a second distance of downward extension having the second cross-sectional area which is constant along the second distance. In some forms, the first section and the second section may each be tubular and the first and second cross-sectional areas may both be circular. An intermediate section may be between the first section and the second section of the drain passageway in which the intermediate section continuously connects the first section to the second section and reduces in diameter between the two sections. The intermediate section may extend over a distance of downward extension and gradually tapers inward from the first section to the second section. This intermediate section may be frusto-conical but may have other types of taper. For example, the first section and the second section may have vertically-extending walls and the intermediate section may be angled 45 degrees relative to the vertically extending walls as the intermediate section extends downward and inward from the first section to the second section. Alternatively, it is contemplated that the reduction in cross section could occur in a single step or may have alternative angular tapers.

In some forms, the drain passageway may be centrally aligned in the base wall of the trench while, in other forms, the drain passageway may be offset from the center in the base wall of the trench. Such variations may be made depending on the particular structure in which the drain is used.

In some forms, the peripheral side walls of the trench may include two pairs of linear parallel segments such that the trench is rectangular in shape. In some forms, a flange may be disposed outward of the peripheral side walls. Once installed, floor coverings (for example, tile, carpet, and so forth) may cover this flange. In other forms of the drain, this flange may be absent.

In some forms, to provide sufficient head pressure in the drain passageway, a ratio of a diameter of the first section to a diameter of the second section may be 1.5 or may be more generally in a range of 1.4 to 1.6.

In some forms, a depth of elevator trench drain exclusive of the drain passageway may be 1.75 inches. Among other things, this minimizes the height requirement for the installation of the elevator trench drain into the floor (which takes up the inter-story space between adjacent floors). Despite have relatively shallow depth, the drain passageway of the elevator trench drain may be configured to permit the flow of 100 gallons per minute or more of water therethrough.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

DETAILED DESCRIPTION

Figure 2:
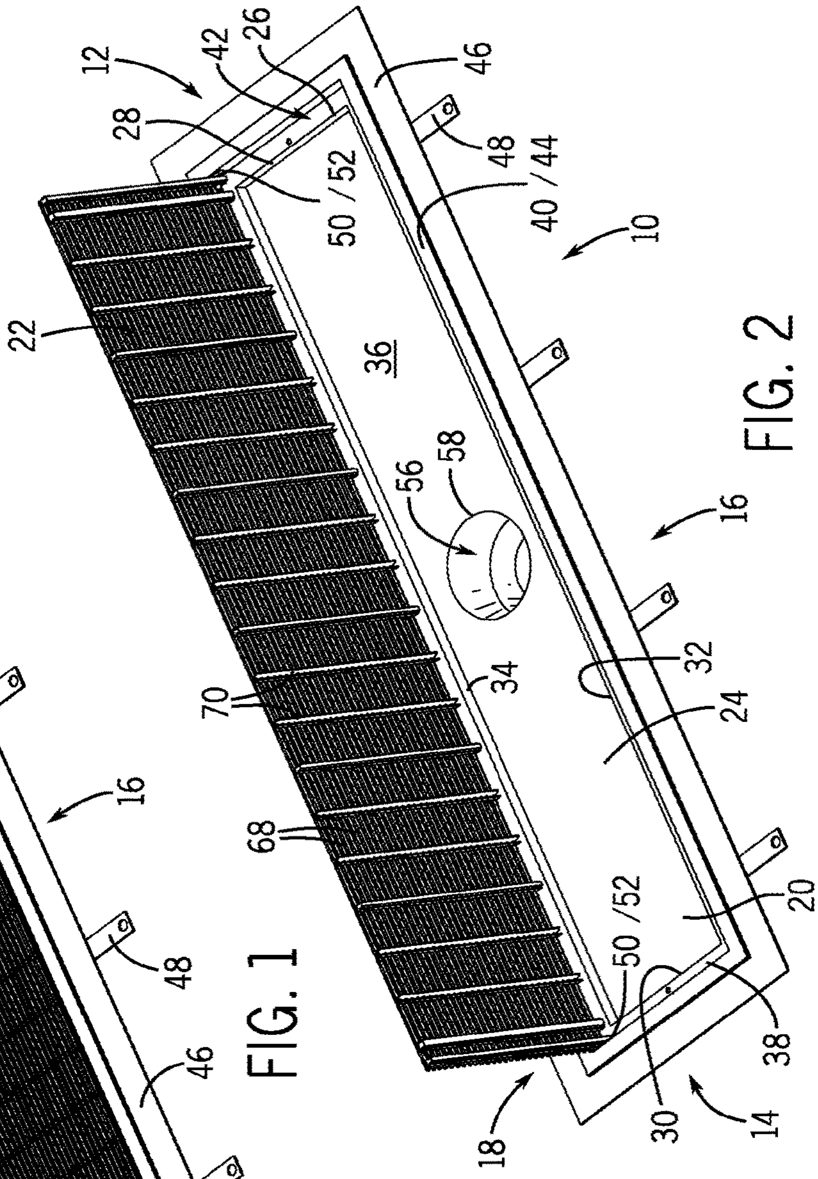
FIG. 2 is a perspective view of the elevator trench drain of FIG. 1 in which a grating is hinged open, revealing the inner volume of the trench and the top side of the drain passageway.
Figure 1:
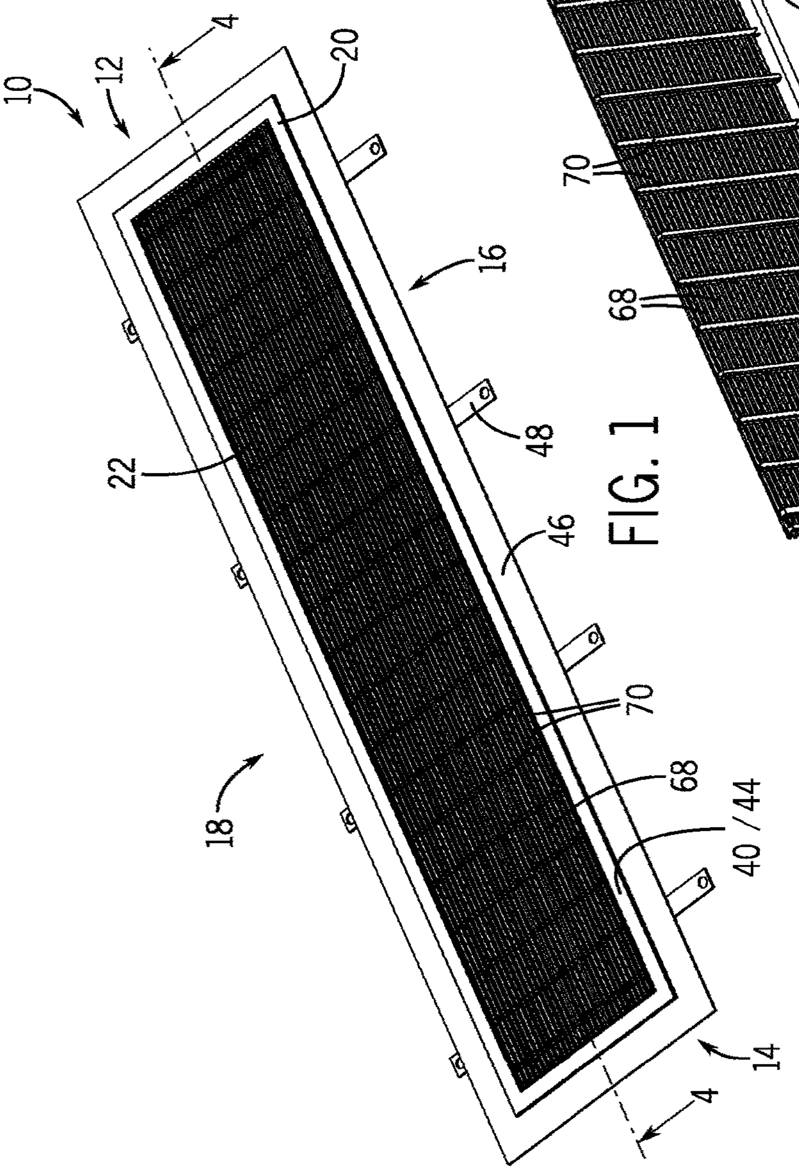
FIG. 1 is a perspective view of an elevator trench drain in which a grating is closed over the trench.

Referring first to FIGS. 1 and 2, an elevator trench drain 10 is illustrated in closed and opened positions, respectively. An elevator trench drain of this type is designed to be installed along the width of the lower edge or threshold of an elevator door. This drain can provide a drainage pathway for fluids, for example water from sprinkler systems. In the absence of such a drain in a situation in which a sprinkler system has been activated, water from the system might collect on the floor and potentially drain into the elevator or elevator shaft. If that were to happen, the elevator system could malfunction in the event of an emergency or be otherwise damaged.

The elevator drain 10 is generally rectangular in the exemplary form shown; however, in other forms, the elevator trench drain 10 may have generally different shapes or aspect ratios which may be custom to the particular application. Because the exemplary elevator trench drain 10 is rectangular, it extends between a pair of lateral ends 12 and 14 which define an overall length of the assembly and extends between a pair of forward and backward ends 16 and 18 which define an overall width of the assembly.

In the illustrated assembly, the elevator trench drain 10 has two main parts including a trench 20 and a grating 22. During use, the water will flow through the grating 22 and collect in the trench 20, though which the water is subsequently drained or evacuated.

The trench 20 has a base wall 24 with peripheral side walls 26 extending upwardly from the base wall 24. Because the particular drain 10 is rectangular, the peripheral side walls 26 include a pair of lateral side walls 28 and 30, a front wall 32, and a rear wall 34. In aggregate, the various walls of the trench 20 defining a trench volume 36 inside the trench 20. In the instant case, this trench volume 36 is generally rectangular in shape being established by the base wall 24, the pair of lateral side walls 28 and 30, the front wall 32, and the rear wall 34.

The various peripheral side walls 26 of the trench 20 also include an inwardly extending step 38 between an upper peripheral lip 40 and the base wall 24 that defines a grating seat 42 for the reception of the grating 22. In the form illustrated, this step 38 occurs approximately halfway between an upper surface 44 of the upper peripheral lip 40 and the base wall 24. During use, water flowing into the trench 20 may also collect (at least to some extent) in the trench volume 36 partially occupied by the grating 22.

The trench 20 may also include features that assist in the installation of the elevator trench drain 10 into the floor, although such features may not be found in all designs. In the particular form illustrated, the trench 20 includes an outwardly-extending peripheral flange 46 that is offset slightly downward from the upper peripheral lip 40. This peripheral flange 46 may receive floor coverings (for it, carpet, tile, cast materials such as concrete) over it such that the top of the floor covering is roughly flush with the upper surface 44 of the upper peripheral lip 40. There may also be anchor straps 48 that extend outwardly past the flange 46 which are employed during the installation of the trench 20 into the surrounding building structure.

Figure 3:
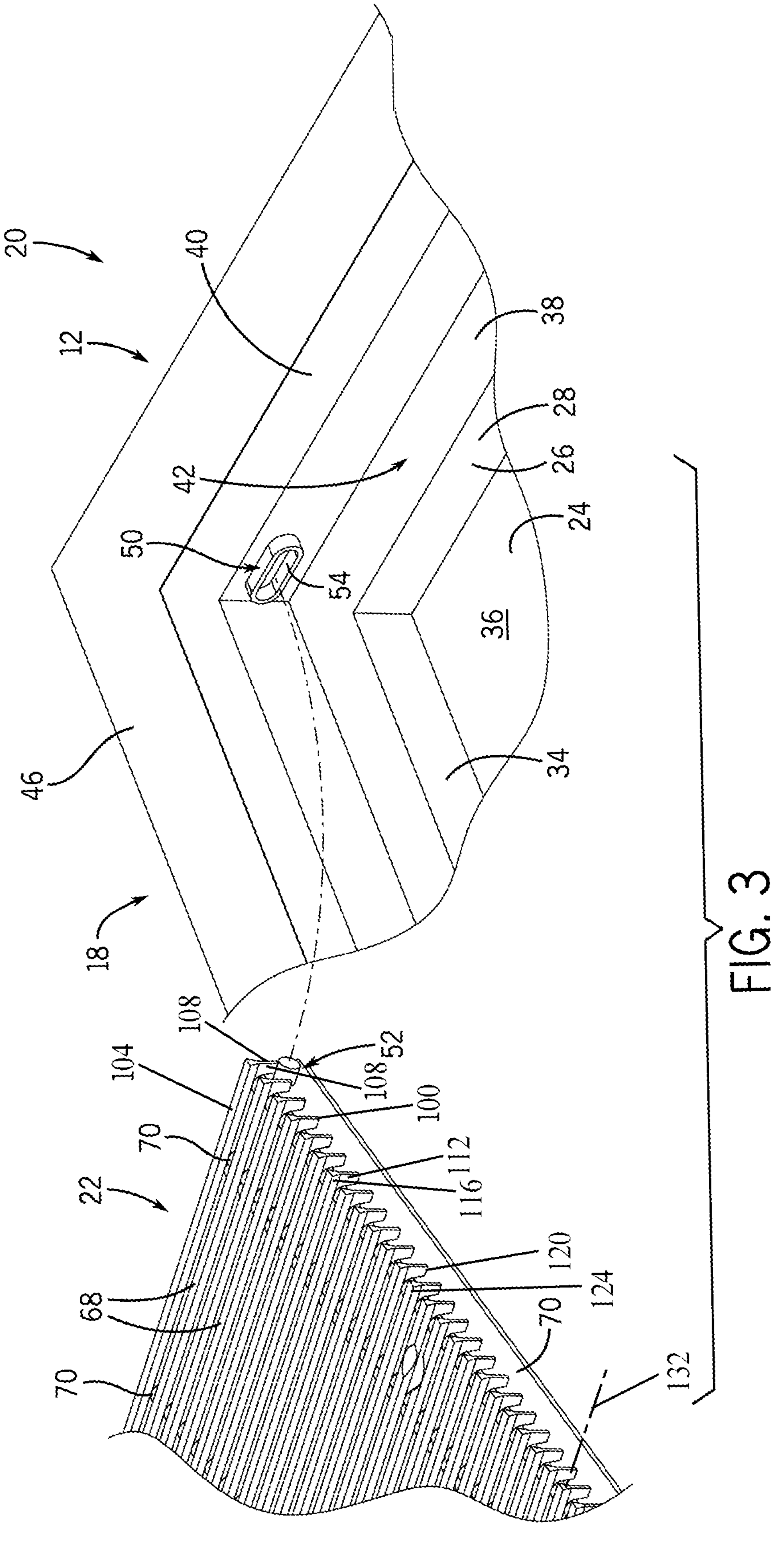
FIG. 3 is a detailed exploded book view of one side the hinge connection between the grating and the trench illustrating how the post of the grating is received in the slot of the trench.

With brief forward reference being made to FIG. 3, to hingedly receive the grating 22 in the trench 20, each of the lateral side walls 28 and 30 may include a slot 50 formed therein such that the slots 50 collectively define a pair of opposing slots. In the particular form illustrated in FIG. 3, the slot 50 is formed above the step 38 in the lateral side walls 28 and 30 proximate the rear wall 34. To accommodate entry of the respective post 52 on the grating 22, these slots 50 are elongated in the front to rear direction such that the grating 22 may be slightly twisted relative the trench 20 and the eventual hinged axis of rotation to provide sufficient clearances for assembly of the posts 52 into the slots 50. In the form illustrated, the slots 50 are integrally formed in the peripheral side walls 26 of the trench 20 and are formed by a wall 54 that extends generally perpendicularly from the peripheral side wall 26 of the trench 20 and forms a closed loop that establishes the slot 50.

Figure 4:
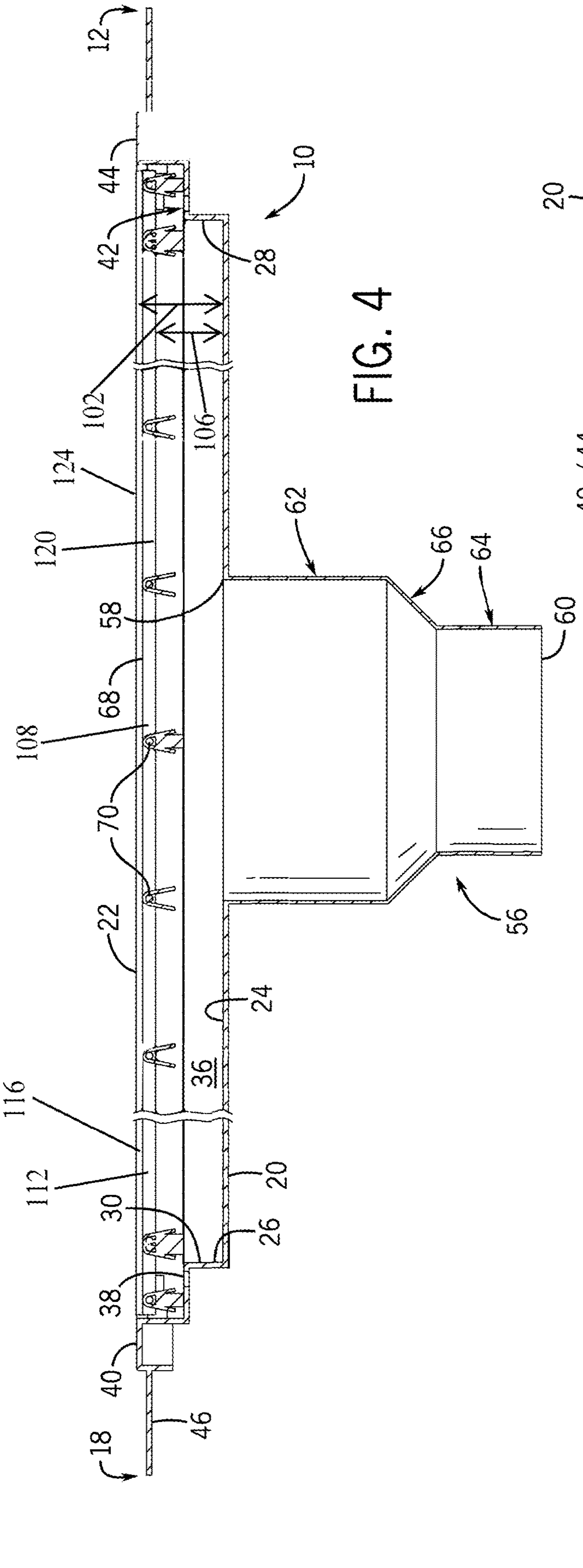
FIG. 4 is a detailed cross-sectional side view of the drain passageway of the elevator trench drain illustrating the reduction in cross-sectional area from the top section to the bottom section of the drain passageway.

With particular reference now being made to FIG. 4, the trench 20 includes a drain passageway 56 that extends downwardly the base wall 24 of the trench 20. As illustrated, the drain passageway 56 is centrally located along the width and length of the trench 20. However, it is contemplated that the drain passageway 56 might be located otherwise such as, for example, at one end of the base wall 24 of the trench 20 or offset from center in one or both of the length and width directions. This drain passageway 56 places the trench volume 36 (at an upper opening 58 formed in the base wall 24) in fluid communication with a lower opening 60 of the drain passageway 56. The lower opening is typically connected in use to a drain pipe such as a 4 inch drain pipe for further routing of the drained water.

Figure 5:
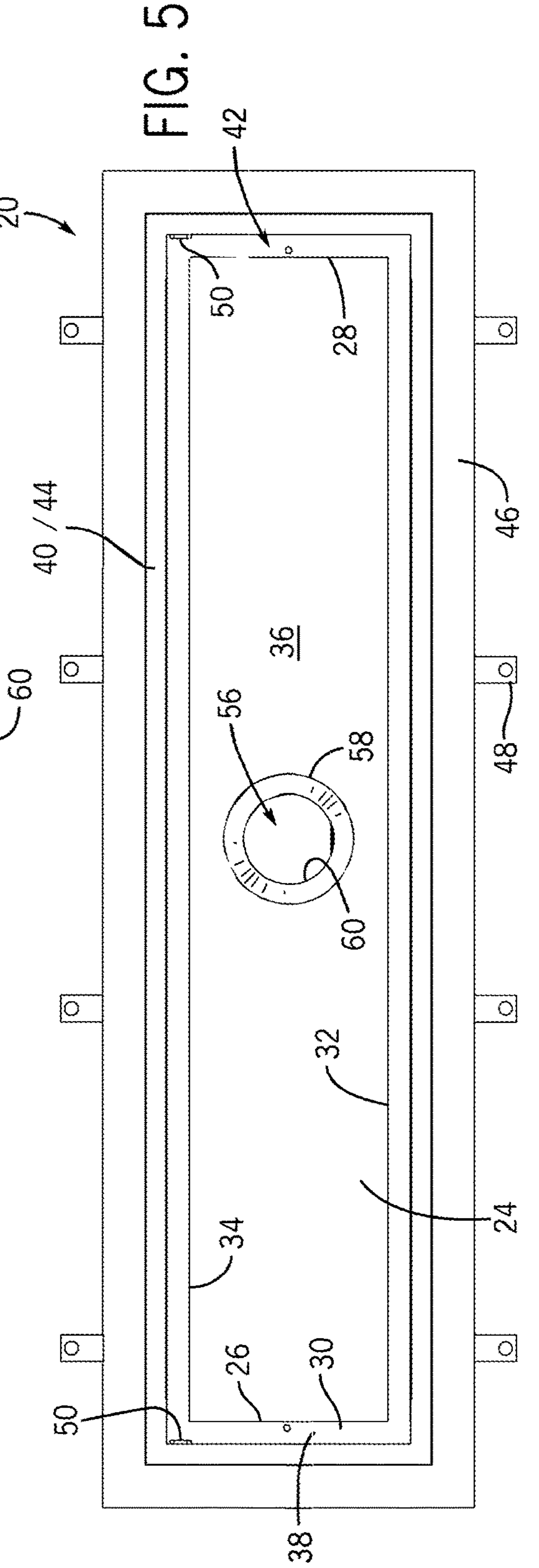
FIG. 5 is a detailed top view of drain passageway further illustrating the profile of the upper and lower sections of the drain passageway as seen from above.

As best seen in FIGS. 4 and 5, the drain passageway 56 has multiple sections as it extends downwardly from the upper opening 58 to the lower opening 60. In the particular form illustrated, there are three sections including an upper section 62 proximate the upper opening 58 in the base wall 24, a lower section 64 proximate the lower opening 60 of the drain passageway 56, and an intermediate section 66 between the upper section 62 and the lower section 64. The upper section 62 and the lower section 64 each have a constant respective cross-sectional area over their axial height or distance of extension. In the illustrated embodiment, the upper section 62 is circular having a diameter of 6 inches and the lower section 64 is circular having a diameter of 4 inches (to match standard drain pipe which is connected to the outlet). The intermediate section 66 between the upper section 62 and the lower section 64 includes an approximately 45 degree taper that transitions the diameter between the respective sections 62 and 64 above and below it. Although the taper is illustrated as extending entirely from the first section to the second section, it is contemplated that there may be more than one differently angled tapered regions or radially extending step in this intermediate section. While circular cross-sections are found in the illustrated design as can be best seen in FIG. 5, it is contemplated that other drain cross sections might also be used if those reduce in cross-section area from the upper section to the lower section.

Among other things, the profile of this drain passageway 56 helps to improve the flow rate of water collecting in the trench 50 through the drain passageway 56. The upper section 62 creates a head pressure which causes the acceleration of the water flowing downward into the lower section 64. Although it is contemplated that the intermediate section 66 might be omitted (i.e., that there could simply be a flat step between sections 62 and 64 which is perpendicular to the central axis of the drain passageway 62), the taper or angling of the intermediate section 66 can further enhance the flow from the upper section 62 to the lower section 64 because it assists in directing the flow of the water in a non-turbulent manner from the upper section 62 into the lower section 64. Among other things, the reduction in diameter to improve and increase flow rate can help enable a low profile (i.e., thin) design so that the elevator trench drain 10 may be installed in smaller spaces without increasing the depth of the floor to accommodate for the drain.

Some exemplary and non-limiting dimensions are now provided for the trench 20. The height of the trench 20 is contemplated as being typically 1.75 inches overall (exclusive of the drain passageway 56), although other depths may also be used depending on the installation context or needs of the customer. A typical width may be 13.5 inches overall with an 11.4375 inch grating seat area. The finished perimeter flange may be approximately 1 inch from the upper peripheral lip 40. The overall length of channel may typically be in a range of 38 to 120 inches. The drain passageway 56 is illustrated as being hydraulically engineered from 6 inches to 4 inches in a funnel style outlet to increase head pressure on the 4 inch section to promote flow (with flow in excess of 100 gallons per minute being targeted in many conditions to meet code and achieved using this passageway structure). This ratio of the diameters from the first section to the second section is approximately 1.5 (6 inches to 4 inches), but it is contemplated that other similar ratios may also be used, for example, in the range of 1.3 to 1.7 or more narrowly in the range of 1.4 to 1.6. The entire trench construction may be provided in Type 304 stainless steel but may also be in Type 316 stainless steel in certain applications or based on customer preference.

The grating 22 is also generally rectangular in shape to match and fit into the grating seat 42 of the trench 20. The exemplary grating 22 includes a first plurality of lengthwise-extending bars 68 which are joined to a second plurality of widthwise-extending supports 70 to form a grid. However, in other forms, the grating pattern may be different or otherwise embellished to provide a desired aesthetic appearance. On the rear side of the grating 22, there are a pair of oppositely facing posts 52 that are located for reception into the slots 50 of the trench 20 as illustrated in FIG. 3. FIGS. 3 and 4 also illustrate that each of the first plurality of lengthwise-extending bars 68 includes a bottom surface 100, facing and positioned a first distance 102 from the base wall 24, a top surface 104, opposite the bottom surface 100 and spaced a second distance 106 from the base wall 24 greater than the first distance, and a pair of side surfaces 108 extending between the bottom surface 100 and the top surface 104. As shown in FIG. 3, the side surfaces 108 are sub-divided into two portions 112, 116. The lower portion 112 of the side surface 108 is oriented substantially parallel to the front or first wall 32 and the upper portion 116 of the side surface 108 is oriented oblique to the front wall 32. More specifically, FIG. 3 shows that the upper portion 116 of the side surfaces 108 are oriented oblique to the front wall 32 in a vertical orientation (e.g., measured vertically). FIG. 3 also illustrates that each of the lengthwise extending bars 68 include a lower edge 120 where the bottom surface 100 meets the side surface 108 and an upper edge 124 where the top surface 104 meets the side surface 108. In the illustrated embodiment, the lower edge 120 is spaced a second distance 106 from the base wall 24 while the upper edge 124 is spaced a first distance 102 from the base wall 24 that is greater than the second distance 106. FIGS. 1 and 3 also show that the upper edge 124 is both parallel to and positioned closer to the front wall 32 than the lower edge 120. The lower edge 120 is also parallel the front wall 32. Each bar 68 also defines a longitudinal axis 132 therethrough that is oriented parallel to the front wall 32.

As noted above, by angularly twisting the axis of the posts 52 (which are co-axial with one another) they can be slid into the slots 50 of the trench 20 to provide a hinged connection to open the grate as generally illustrated in FIG. 2. There may be some range of motion restrictions depending on the depth of the grating seat 42 and the placement of the posts 52 on the grating 22.

The grating 22 may be a stainless steel wire grating and may be approximately 2 inches shorter than the specified channel length to accommodate installation of the grating 22 into the trench 20 and provide some side clearances. As with the trench 20, the grating 22 may be manufactured from Type 304 stainless steel or Type 316 stainless steel. In one exemplary form, the grating 22 may features an open area of 64.9 square inches per linear foot of grating. Wires, bars, and supports may be held by press fit and welded to support trusses (i.e., the bars 68 may be press fit and welded into supports 70 or vice versa). Some gratings may be a fabricated stainless steel slotted grate with an open area of 35.9 square inches per linear foot. In some forms, grating height may be 29/32 inches tall and grating width may be 11.375 inches wide.

Accordingly, an elevator trench drain is disclosed that accommodates high flow rates (up to and exceeding 100 gallons per minute) without having a deep trench depth or necessarily having multiple outlets to accommodate slower flows. The improved drain passageway permits high flow rates without compromising other dimensions of the product or complicating the drain system with additional, multiple fluid connections.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A trench drain comprising:

a trench including a base wall, a first wall extending from the base wall, and a second wall extending from the base wall, the base wall, the first wall, and the second wall at least partially defining a trench volume therein, the trench having a trench height, a trench length, and a trench width, the trench length is greater than the trench width, and the trench length is at least 60 times the trench height;

a drain passageway extending through the base wall and including a distal end opposite the base wall, the distal end having an outlet, the outlet having an inner diameter that is no greater than 4 inches; and a grate at least partially positionable within the trench volume, the grate configured to allow fluid to pass therethrough.

2. The trench drain of claim 1, wherein the grate includes a plurality of bars configured to allow fluid to pass therebetween, wherein at least one of the plurality of bars includes a bottom edge positioned a first distance from the base wall and a top edge positioned a second distance from the base wall greater than the first distance, and wherein the top edge is positioned closer to the first wall than the bottom edge.

3. The trench drain of claim 1, wherein the drain passageway includes a first section connected to the base wall defining a first diameter and a second section distal the base wall defining a second diameter that is less than the first diameter.

4. The trench drain of claim 3, wherein a ratio of the first diameter to the second diameter is between 1.3 and 1.7.

5. The trench drain of claim 3, wherein a ratio of the first diameter to the second diameter is between 1.4 and 1.6.

6. The trench drain of claim 3, wherein a reduction from the first diameter to the second diameter creates a head pressure that increases flow out of the outlet.

7. The trench drain of claim 1, wherein the trench height is 1.75 inches.

8. The trench drain of claim 1, wherein the drain passageway is configured to permit flow of at least 75 gallons per minute of water therethrough.

9. A trench drain comprising:

an elongated trench defining a trench volume therein, the elongated trench having a trench height, a trench length, and a trench width, the trench length is at least eight times the trench width, and the trench length is at least 60 times the trench height;

a drain passageway open to the trench volume, the drain passageway extending away from the trench volume and including a distal end spaced apart from the trench volume, the distal end having an outlet, the outlet having an interior diameter that is no greater than 4 inches; and a grate at least partially positioned within the trench volume, the grate including a plurality of elongated openings through which fluid can enter the trench volume, the elongated openings having an opening length and an opening width, the opening length being greater than the opening width, and the trench length oriented substantially parallel to the opening length.

10. The trench drain of claim 9, wherein the drain passageway is configured to permit flow of at least 75 gallons per minute of water therethrough.

11. The trench drain of claim 9, wherein the drain passageway includes a first section connected to the trench volume defining a first diameter and a second section distal the trench volume defining a second diameter that is less than the first diameter.

12. The trench drain of claim 11, wherein a ratio of the first diameter to the second diameter is between 1.3 and 1.7.

13. The trench drain of claim 11, wherein a ratio of the first diameter to the second diameter is between 1.4 and 1.6.

14. The trench drain of claim 11, wherein a reduction from the first diameter to the second diameter creates a head pressure that increases flow out of the outlet.

15. A trench drain comprising:

an elongated trench defining a trench volume therein, the elongated trench having a trench height, a trench length, and a trench width, the trench length being greater than the trench width, the trench height is no greater than 1.75 inches, and the trench length is at least 60 times the trench height;

a drain passageway open to the trench volume, the drain passageway extending away from the trench volume and including a distal end spaced apart from the trench volume; and a grate at least partially positioned within the trench volume, the grate including a plurality of elongated openings through which fluid can enter the trench volume, the elongated openings having an opening length and an opening width, the opening length being greater than the opening width, and the opening length being oriented substantially parallel to the trench length.

16. The trench drain of claim 15, wherein the drain passage way includes an upper section defining a first diameter proximate the trench volume and a lower section defining a second diameter proximate the distal end, and wherein the second diameter is less than first diameter.

17. The trench drain of claim 16, wherein a ratio of the first diameter to the second diameter is between 1.3 and 1.7, and wherein the distal end has an inner diameter that is no greater than 4 inches.

18. The trench drain of claim 16, wherein a reduction from the first diameter to the second diameter creates a head pressure that increases flow out of the distal end.

19. The trench drain of claim 15, further comprising:

a base wall having peripheral side walls extending upwardly therefrom and an outwardly-extending peripheral flange that together define at least a portion of a perimeter of the trench; and a grate seat disposed between an upper peripheral lip and the base wall, and wherein the grate is hingedly connected to the trench, wherein the grate seat is configured to receive the grate and the peripheral side walls of the trench have a pair of opposing elongated slots formed therein and the grate has a pair of posts on opposed ends thereof, wherein each of the pair of posts on the grate are received in a respective one of the pair of opposing elongated slots of the trench to establish an axis of rotation, and wherein the axis of rotation is movable relative to the trench.

20. The trench drain of claim 19, wherein the elongated slots are sized so that the posts can be inserted into and removed from the slots by moving the axis of rotation relative to the trench.

* * * * *